United States Patent [19]

Berchielli et al.

[11] 3,914,813
[45] Oct. 28, 1975

[54] EMERGENCY LIGHT MEANS

[75] Inventors: Aldo S. Berchielli, Westerly, R.I.;
Ronald J. Cercone, Pawcatuck, Conn.

[73] Assignee: Yardney Electric Corporation, Pawcatuck, Conn.

[22] Filed: Sept. 18, 1974

[21] Appl. No.: 507,181

[52] U.S. Cl. ................................................. 9/8.3 E
[51] Int. Cl.² ............................................ B63B 45/00
[58] Field of Search ............ 9/8.3 E, 8.3 R; 43/17.5; 136/86 A, 100 M; 240/26, 6.4 R, 10.5

[56] References Cited
UNITED STATES PATENTS

| | | | |
|---|---|---|---|
| 2,721,342 | 10/1955 | Pickren | 9/8.3 E |
| 3,384,781 | 5/1968 | Holle | 9/8.3 R |
| 3,421,246 | 1/1969 | Jinnshi et al. | 43/17.5 |
| 3,559,224 | 2/1971 | Shimizu | 9/8.3 E |
| 3,682,706 | 8/1972 | Yardney et al. | 136/86 A |

Primary Examiner—Trygve M. Blix
Assistant Examiner—Gregory W. O'Connor
Attorney, Agent, or Firm—Donald E. Nist

[57] ABSTRACT

An improved emergency light means, particularly useful as a sea beacon, comprises a hollow shell containing an air flotation chamber and a water ballast chamber sealed from the flotation chamber. One or more electrochemical cells are disposed in the shell and are activatable by water. Preferably, a reservoir of dry, water-soluble electrolyte is included in the shell. The cathode of each cell is exposed to the flotation chamber and sealed from the water chamber, while the reverse is the case for each anode. A water inlet is provided through the shell and into the water chamber so that when the beacon is placed in water, the cell is activated and the shell floats at a predetermined level in the water. A bulb in the upper transparent end of the shell thereupon emits light, indicating an emergency.

3 Claims, 11 Drawing Figures

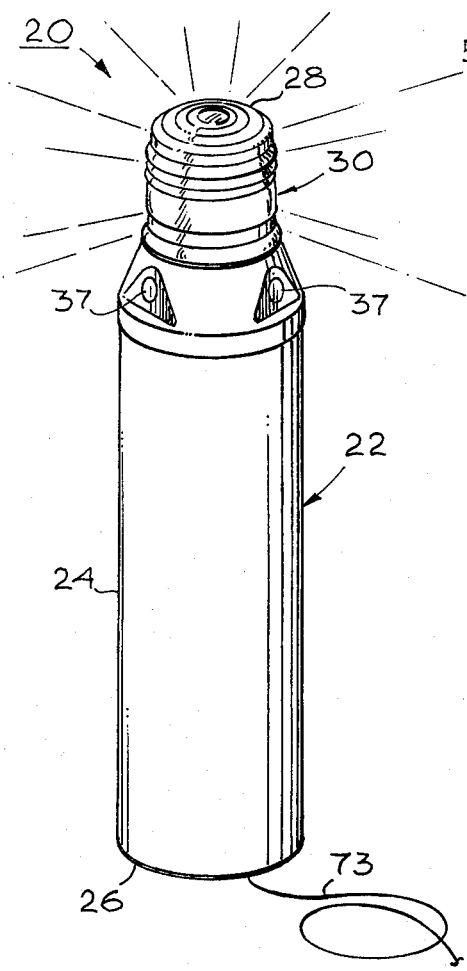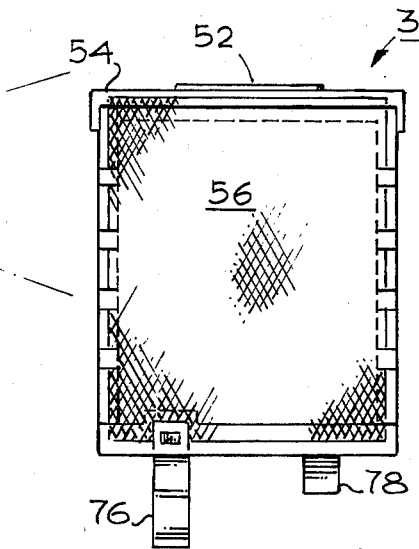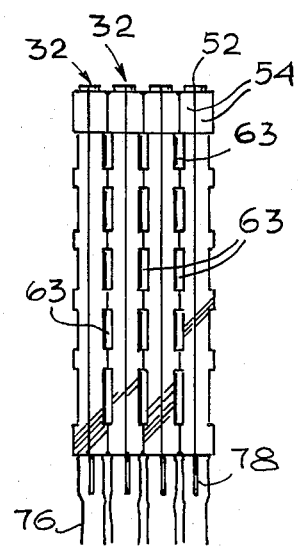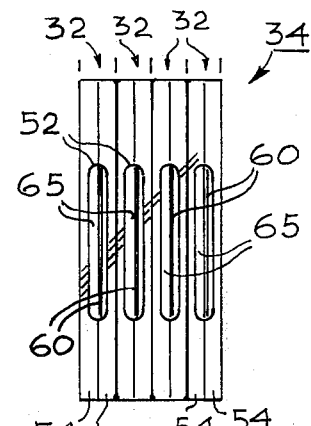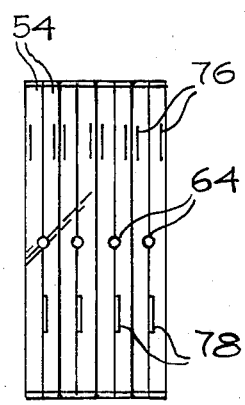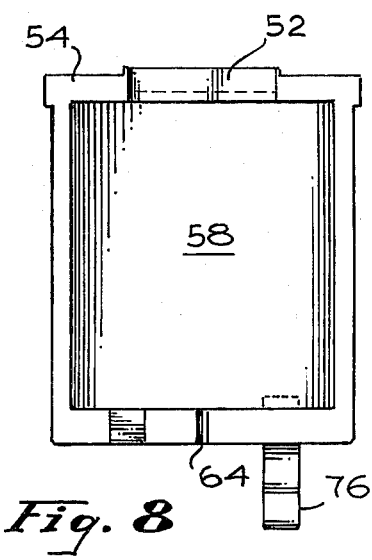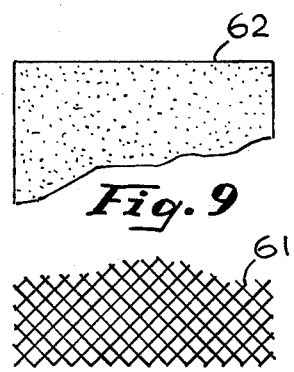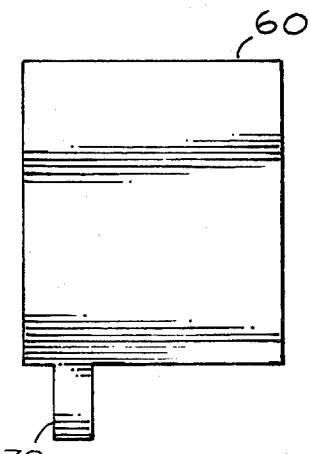

EMERGENCY LIGHT MEANS

BACKGROUND OF THE INVENTION

1. Field of the Invention

The present invention generally relates to lights and more particularly to water-activatable emergency beacons and the like.

2. Prior Art

Certain types of emergency beacons and the like light emitters carry one or more dry electrochemical cells which may have a relatively short normal life and which therefore may fail during an infrequent emergency. Certain wet types of electrochemical cells can also be used in emergency beacons or the like. However, they normally require filling with liquid electrolyte carried in a separate bag or container. In an emergency, time may be of the essence so that such a filling chore in order to activate the beacon would be unacceptable. This is especially true at sea, where emergencies usually arise under foul turbulent weather conditions.

Accordingly, there is a need for an emergency beacon or the like which is simple, inexpensive, durable and has a long storage life, as well as a long life in use. Such beacon should not require filling of electrolyte from a separately carried container or any other manipulation which would interfere with the speed with which the beacon can be made operational.

SUMMARY OF THE INVENTION

The present invention satisfies the foregoing needs. An emergency light means, such as a beacon, is provided substantially as set forth in the Abstract above. The beacon is particularly adapted for use in water, such as at sea, and has a hollow outer shell with one or more electrochemical cells disposed in it. An air flotation chamber is formed between the sidewall of the shell and the cells, with the cathode of each cell exposed to the flotation chamber. A water ballast chamber is also disposed in the shell and is sealed off from the flotation chamber. The anode of each cell is disposed in the water chamber. The water chamber may also include a reservoir containing dry electrolyte and communicating with the electrolyte space in each cell. A water inlet permits water to enter the water chamber, as when the device is thrown overboard. The water entering the water chamber dissolves the dry electrolyte and activates each cell. Power is thereby generated and is transmitted to a light bulb in a transparent dome at the upper end of the shell so as to cause the bulb to emit light. The flotation chamber keeps the shell from sinking while water in the water chamber maintains a predetermined portion of the shell immersed in water and helps keep the shell in an upright posture for maximum viewing of the light being emitted. The cells can be of metal-air type for maximum efficiency of the light as an emergency signaling means. Further information on the invention is set forth in the following detailed description and accompanying drawings.

DRAWINGS

FIG. 1 is a schematic perspective view of a preferred embodiment of the emergency light means of the invention;

FIG. 4 is a schematic front elevation of a stack of four electrochemical cells utilized in the embodiment of FIG. 1;

FIG. 5 is a schematic side elevation of the stack of cells of FIG. 4;

FIG. 6 is a schematic top plane view of the stack of cells of FIG. 4;

FIG. 7 is a schematic bottom plan view of the stack of cells of FIG. 4;

FIG. 8 is a schematic rear elevation of a single frame in the stack of cells of FIG. 4, said frame bearing a carbon cathode;

FIG. 9 is a schematic front elevation of a cell separator sheet utilized in each cell in the stack of FIG. 4;

FIG. 10 is a schematic front elevation of a magnesium metal anode utilized in each cell in the stack of FIG. 4; and, FIG. 11 is a schematic front elevation of a separator grid utilized between adjacent cells in the stack of FIG. 4.

DETAILED DESCRIPTION

Figure 2:
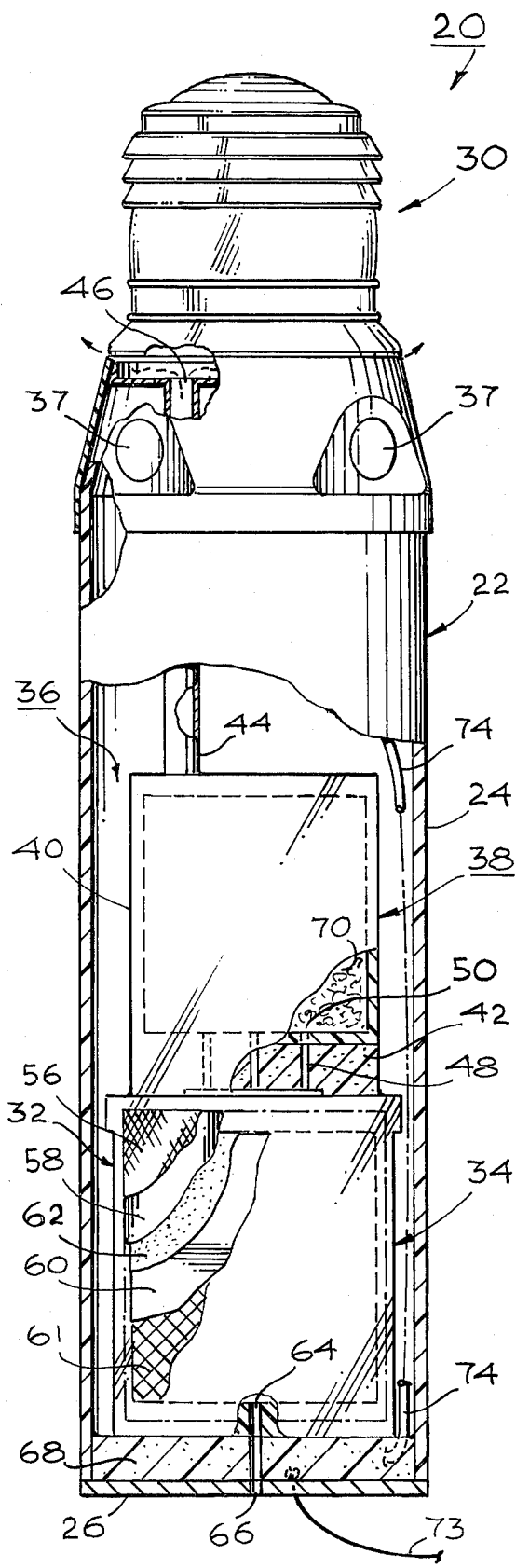
FIG. 2 is schematic front elevation of the emergency light means of FIG. 1, partly broken away and partly in section to illustrate certain internal features thereof.

Now referring more particularly to FIG. 1 of the drawings, a preferred embodiment of the emergency light means of the invention is schematically depicted in perspective view. Thus, an emergency light beacon 20 is shown which includes a hollow closed outer shell 22 of water-resistant plastic or the like, comprising a cylindrical sidewall 24, a closed bottom end 26 and a closed upper end 28, the latter fitted with a transparent dome 30 of glass, plastic or the like.

Figure 3:
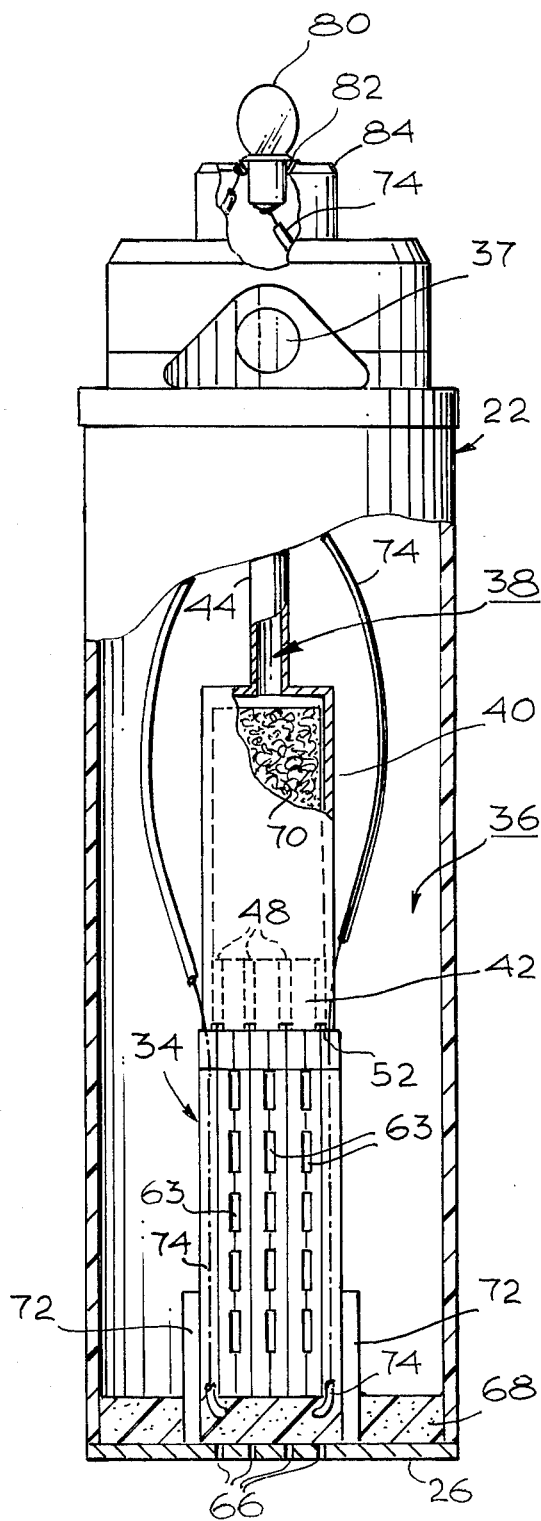
FIG. 3 is a schematic side elevation of the emergency light means of FIG. 1, partly broken away and partly in section to illustrate certain internal features thereof.

As shown schematically in FIGS. 2 and 3, beacon 20 has one or more electrochemical cells 32 disposed in a stack 34 within shell 22 and spaced inwardly from sidewall 24 to form therebetween a flotation chamber 36. Chamber 36 communicates with the exterior through one or more waterimpermeable, gas-permeable membranes 37 disposed in shell 22 below dome 30 (FIGS. 1 and 2). Membranes 37 can be of any suitable film material, for example, selected propylene or tetrafluoroethylene plastic film.

A water ballast chamber 38 sealed from chamber 36 is also disposed within shell 22 and comprises, in part, a reservoir 40 sealed to the upper end of stack 34 by an electrolyte barrier 42 and a tube 44 extending up from the top of reservoir 40 into communication with a gas outlet 46 immediately below dome 30. Barrier 42 is provided with a plurality of openings 48 extending from the upper end thereof to the lower end thereof and in communication with similar openings 50 in the bottom end of reservoir 40 and with an opening 52 (FIG. 6) in the upper end of each cell 32 in the stack 34.

As shown more particularly in FIGS. 4 – 10, each cell 32 comprises a pair of frames 54 of electrically insulative water resistant material such as modified styrene, plastic or the like, the outer surface of which is covered with a gas-permeable, water-impermeable film or cloth 56, such as tetrafluoroethylene of the like. Within the inner recessed surface of each frame 54 is disposed a sheet 58 of cathode material such as carbon, tungsten-bronze, silver, platinum or the like, separated from a suitable anode plate 60 of, for example, magnesium, aluminum, zinc or the like, by a sheet 62 of separator material, for example, modified cellulose or the like. Adjacent cells 32 in the stack 34 are separated by a thin electrically insulative grid 61 of nylon, ethylene, propylene or other plastic material or the like. It will be seen that the cathodes 58 sheathed in film 56 are exposed to air in chamber 36 because of a plurality of passageways 63 between adjacent cells 32 and because the front and back of stack 34 are directly exposed to chamber 36 while the sides of stack 34 are enclosed in abutting frames 54.

The lower end of each cell 32 is provided with a hole 64 (FIG. 7) extending through frames 54 and into communication with an electrolyte space 65 in each cell 32 in which separators 62 and anode 60 are disposed. Thus, anodes 60 are isolated from chamber 36 but are exposed in water chamber 38. Top opening 52 in each cell 32 also extends to the electrolyte space 65 for that cell.

A series of four separate openings 66 extend up from the outer surface of bottom end 26 of shell 22 through a plastic seal 68 of epoxy resin or the like, upon which stack 34 in shell 22 rests, and into communication with holes 64 in the bottom of the four cells 32. Accordingly, when the lower end 26 of shell is placed in water, water passes up through openings 66, into the electrolyte space 65 in each cell 32 and up through openings 52, 48 and 50, thus reaching reservoir 40.

Reservoir 40 is provided with an absorbent pad 70 of cellulosic material of the like which retains finely divided solid particulate water-soluble electrolyte (not shown), for example, sodium chloride. A cell system which utilizes sea water as the electrolyte is particularly desirable, the dry salt being made available in case the device is used in fresh water. Such solid electrolyte is dissolved by the water passed thereto and the dissolved electrolyte then passes to the cell electrolyte spaces 65 and activates cells 32. Gas which may be generated during operation of cells 32 passes up through spaces 65, openings 52, 48 and 50, reservoir 40 and tube 38 and out of shell 22 through outlet 46.

Water ballast chamber 38 is defined by components 38, 40, 48, 50, 52, 65 and 66 and is totally isolated from flotation chamber 36. When water rises in chamber 38, as described above, its weight acts as a ballast to hold shell 22 upright. Flotation chamber 36 keeps shell 22 from sinking. Lead weights 72 or the like (FIG. 3) preferably are provided to also aid in keeping shell 22 in an upright condition. A tether line 73 secured to lower end 26 may be used to secure shell 22 to prevent it from floating away from the emergency site.

Electrical leads 74 (FIGS. 2 and 3) run from the base of stack 34, specifically from leads 76 and 78 (FIGS. 4, 5, 8 and 10) of each cell 32, through seal 68 and up through chamber 36 to a light bulb 80 disposed in a socket 82 (FIG. 3) in a configured base 84 at the upper end 28 of shell 22. Dome 30 (FIG. 2) extends over and around bulb 80, socket 82 and the upper end of base 84. Bulb 80, positioned in dome 30, is powered by cells 32 and emits a bright steady or intermittent light which serves as an effective emergency signal beacon viewable from a long distance.

It will be understood that beacon 80 can be made inexpensively of readily available materials and can be stored indefinitely without deterioration prior to its use. Moreover, it can be activated substantially instantaneously merely by dropping it in water during an emergency, whereupon it will float and emit the desired light for a long time. Other advantages are set forth in the foregoing.

Various modifications, changes and alterations can be made in the improved emergency light means of the invention, its components and their parameters. All such modifications, changes and alterations as are within the scope of the appended claims form part of the present invention.

What is claimed is:

1. An improved emergency light means comprising, in combination:
   a. a closed, hollow elongated outer shell having a water inlet;
   b. a water ballast chamber enclosed by and spaced inwardly of said shell and communicating with said water inlet;
   c. at least one water-activatable electrochemical cell enclosed by and spaced inwardly of said shell;
   d. an air flotation chamber enclosed by said shell and peripheral of and defined by said water ballast chamber and said cell;
   e. light emitting means disposed in and adjacent the upper end of said shell and viewable external of said shell;
   f. electrical current carrying means interconnecting said cell and said light emitting means for powering the latter; and,
   g. a transparent dome sealed to the upper end of said shell over said light emitting means; said cell including a cathode exposed to said flotation chamber and sealed from said water chamber, an anode sealed from said flotation chamber and disposed in said water chamber and an electrolyte space between said anode and cathode, said water chamber including an electrolyte reservoir containing dry electrolyte-forming material activatable by water passing thereinto through said inlet, said reservoir being in communication with said electrolyte space through a solids barrier, said shell including a gas outlet communicating with said water chamber and, adjacent the upper end thereof, a gas-porous, water-impervious portion communicating with said flotation chamber.

2. The improved emergency light means of claim 1 wherein said light means comprise a beacon, wherein said light-emitting means comprise a light bulb, wherein said current-carrying means comprises wires, and wherein a plurality of said electrochemical cells are disposed in stacked relation adjacent the lower end of said shell below said electrolyte reservoir and are electrically interconnected in series, said cells comprising air depolarizable cells.

3. The improved emergency light means of claim 2 wherein solid particulate electrolyte is disposed on water-absorbent support material in said reservoir, wherein a gas tube extends up from said reservoir in said shell and communicates with the exterior of said shell adjacent the juncture of said cell and dome, wherein a plurality of spaced membranes covering openings in said shell adjacent the upper end thereof comprise said gas-porous, water-impervious portion and wherein said solids barrier comprises a solid block sealed to the bottom of said reservoir and top of said stack and bearing a plurality of small openings matching like openings in said reservoir bottom and stack top.

* * * * *